(12) United States Patent  
Korenjak et al.

(10) Patent No.: US 7,210,444 B2  
(45) Date of Patent: May 1, 2007

(54) VARIABLE AIR INTAKE PIPE LENGTH

(75) Inventors: Norbert Korenjak, Stadl Paura (AT); Heinz Kusel, Pennewang (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 10/439,324

(22) Filed: May 16, 2003

(65) Prior Publication Data

US 2003/0233992 A1    Dec. 25, 2003

Related U.S. Application Data

(60) Provisional application No. 60/380,868, filed on May 17, 2002.

(51) Int. Cl.  
*F01B 75/18* (2006.01)

(52) U.S. Cl. .............................. 123/184.55; 123/184.56

(58) Field of Classification Search .......... 123/184.55, 123/184.56, 184.53  
See application file for complete search history.

(56) References Cited

U.S. PATENT DOCUMENTS

| | | | |
|---|---|---|---|
| 4,726,329 A | | 2/1988 | Atkin et al. |
| 5,709,182 A | * | 1/1998 | Espe et al. ............. 123/184.55 |
| 5,813,380 A | * | 9/1998 | Takahashi et al. ..... 123/184.55 |
| 5,937,821 A | * | 8/1999 | Oda et al. ................ 123/295 |
| 6,216,666 B1 | * | 4/2001 | Handl et al. ............... 123/308 |
| 6,539,907 B2 | * | 4/2003 | Ino et al. ............... 123/184.55 |
| 6,668,782 B2 | * | 12/2003 | Bochum et al. ........ 123/184.55 |
| 6,732,695 B2 | * | 5/2004 | Pietrowski et al. ..... 123/184.55 |

FOREIGN PATENT DOCUMENTS

| | | |
|---|---|---|
| DE | 1 009 429 | 5/1957 |
| DE | 8 704 464 U | 5/1987 |
| DE | 196 34 913 A1 | 8/1996 |
| EP | 0 747 584 B1 | 11/1996 |
| EP | 0 790 394 B1 | 8/1997 |
| EP | 1094210 A1 | 4/2001 |
| EP | 1167717 A1 | 1/2002 |
| JP | 59-101535 | 6/1984 |
| JP | 59173519 | 10/1984 |
| JP | 60147531 | 8/1985 |
| JP | 61-049124 | 3/1986 |
| JP | 63-012822 | 1/1988 |
| JP | 63-065125 | 3/1988 |
| JP | 63-198721 | 8/1988 |
| JP | 64-56916 | 3/1989 |
| JP | 01-219315 | 9/1989 |
| JP | 08-326546 | 5/1995 |
| JP | 09-125968 | 5/1997 |
| JP | 09-125969 | 5/1997 |

OTHER PUBLICATIONS

European Search Report, Van Zoest, A., Application No. EP 03 01 1375, Jan. 27, 2005, The Hague.  
Annex to the European Search Report, Van Zoest, A., Application No. EP 03 01 1375, Jan. 27, 2005, The Hague.

* cited by examiner

*Primary Examiner*—Marguerite McMahon  
(74) *Attorney, Agent, or Firm*—Osler, Hoskin & Harcourt LLP (57) ABSTRACT

An air intake system for an internal combustion engine has at least one air box and a short duct for each cylinder. Each duct can be extended to provide higher torque at low speed. At high speed, the shorter duct length can be selectively provided for enhanced engine performance.

18 Claims, 5 Drawing Sheets

VARIABLE AIR INTAKE PIPE LENGTH

The present application claims priority to U.S. Provisional Application Ser. No. 60/380,868, which was filed on May 17, 2002, the entirety of which is hereby incorporated into the present application by reference.

BACKGROUND OF THE INVENTION

1. Field of the Invention

The present invention relates to an air induction system of an internal combustion engine. More particularly, the invention relates to varying the length of an intake pipe of an air intake system of an engine. The invention also relates to varying the intake volume of the intake system of the engine.

2. Discussion of Related Art

As is conventionally known, combustion engines take in air to mix with fuel to provide the combustion that fires the engine. Performance of combustion engines can be varied by changing a number of variables, including the amount of air taken in and the path through which the air travels. One way to enhance engine performance is to increase the volume of air taken in by the air intake system. Another way to enhance performance is to reduce resistance experienced by the air in the air intake system. It is known that extending intake ducts can provide an engine with higher torque at a lower speed. However, at higher speeds it is more desirable to have shortened intake ducts to gain more power.

One prior art method of modifying an air intake or induction system to enhance performance is disclosed in DE 38 20 674 A1, in which the length of individual intake pipes can be varied continuously by moving the pipe elbows in and out telescopically while guided in stationary intake manifolds. During a low rotational speed of the internal combustion engine, these individual intake pipes are at their maximal length and their inlet openings rest against an interior wall of a suction distributor that surrounds the pipe elbows. In this position, the suction distributor supplies air to the individual intake pipes by way of a pipe connected thereto. When the rotational speed of the engine increases, the pipe elbows are swivelled into the intake manifolds so that the inlet openings lift away from the interior wall and the individual intake pipes take air in directly from the suction distributor.

Similar devices are known from the U.S. Pat. No. 5,143,026A and EP 0 747 584 A1, where pipe elbows are held in the air collector in an open condition on a stationary shaft so that they can be swivelled into different positions. In the first position, one outlet opening of the pipe elbow rests directly on an inlet opening of the intake manifold. As a function of the rotational speed and/or the load, in the first position, the intake path is formed relatively long by the intake manifolds and the pipe elbows. This results in an increase of the engine torque at low engine speed. In a second position of the pipe elbows, the intake manifolds take air in directly from the air box, which results in more power at high engine speeds.

These prior art devices require additional room to effect movement and involve several moving parts in often complicated operations.

SUMMARY OF THE INVENTION

An aspect of embodiments of the invention provides an air intake system for an internal combustion engine in which the length of the pipes, which guide the air to the cylinders, can be varied in a simple manner.

Other aspects of embodiments of the invention allow a relatively small installation space, a simple mounting arrangement and a relatively maximum shifting range of the length of the pipes.

One aspect of the invention is directed to an air intake system for use in an internal combustion engine, comprising an air box having an air inlet and an outlet and a suction pipe. The suction pipe has a central axis and is connected to and extends from the outlet of the air box for supplying air to a cylinder head of the internal combustion engine. The suction pipe includes a fixed part disposed on one side of the central axis and a movable part disposed on the other side of the central axis. The movable part is selectively movable with respect to the fixed part to vary an intake length of an air path to the cylinder head.

Another aspect of the invention is directed to an internal combustion engine comprising a cylinder head, an air intake, and a suction pipe connected between the air intake and the cylinder head. The suction pipe has a longitudinal central axis and includes a fixed part disposed on one side of the longitudinal axis and a movable part disposed on the other side of the longitudinal axis. The movable part is selectively movable to mate with the fixed part so that the suction pipe can be adjusted in length.

The fixed part may be formed as part of the air box of the air intake system. The movable part may be mounted on a pivot to selectively control the length of the suction pipe. The pivotal arrangement of the movable tube part only requires a small force to pivot the movable tube part over a large range for adjusting the length of the suction pipe, so the suction pipe adjustment can be effected simply and securely. An actuator may be provided to control movement of the movable part. The operation of the pivoting motion takes place, for example, based on low air pressure, a tachogenerator or rotational speed sensor via a magnetic switch, a central processing unit and the like, depending on the respective load level and/or the rotational speed of the engine.

As should be appreciated by those skilled in the art, the invention is particularly useful for high performance engines, such as those used in motorcycles, as the subject of the invention facilitates rapid shifting of the length of the intake pipe(s) and/or volume(s) of the air intake passageway(s) (a path(s) to such engines.

An air inlet control panel may be provided to move simultaneously with the movable part to control the area of the air inlet. The air inlet control panel allows an unthrottled air supply into the air box when the movable tube part is pivoted away from the fixed tube part at high rotation speeds of the engine. By this, an substantial decrease in the sucking-noise occurs in the lower speed range.

The divided suction pipe may be straight or curved. The suction pipes according to the invention may also be used for single and multi cylinder engines. Curved tubes are preferably divided along their curvature plane and have the advantage that large tube lengths can be realized within a small space.

It is particularly advantageous to construct the movable intake suction pipe or manifold part into an air box lid and the fixed tube half into the air box. The air box lid is airtight and is connected to the air box case via a bellows. When the lid is mounted tightly onto the air box, the extended suction pipe length for the low speed range of the engine is provided. The short suction pipe length for the upper speed range results in a lifting of the air box lid from the air box, which brings, according to one preferred embodiment of the invention, the additional positive effect of an enlargement of the air box volume. Such enlargement of the air box volume results in a further enhancement of the engine performance.

According to a preferred embodiment of the invention, the suction pipe can be divided in half or have some moveable sections which are smaller or larger than a half thereof. This construction enables the suction pipe to be opened at least partly in the longitudinal direction, especially in the direction of the centerline of the suction pipe.

These and other aspects, advantages and features of the invention will become apparent in view of the following detailed description of the invention.

DETAILED DESCRIPTION OF THE DRAWINGS

In the drawings, which form part of this original disclosure, like elements are represented by like reference numerals.

DETAILED DESCRIPTION OF PREFERRED EMBODIMENTS

The present invention is described in a greater detail below with reference to the accompanying drawings which illustrate preferred embodiments of the invention. The invention is described as part of an internal combustion engine. The type of engine is not limited and it should be understood that the air intake concepts disclosed herein as the invention can be applied to any type of air intake system in which it is desired to vary the volume of air taken in.

Figure 1:
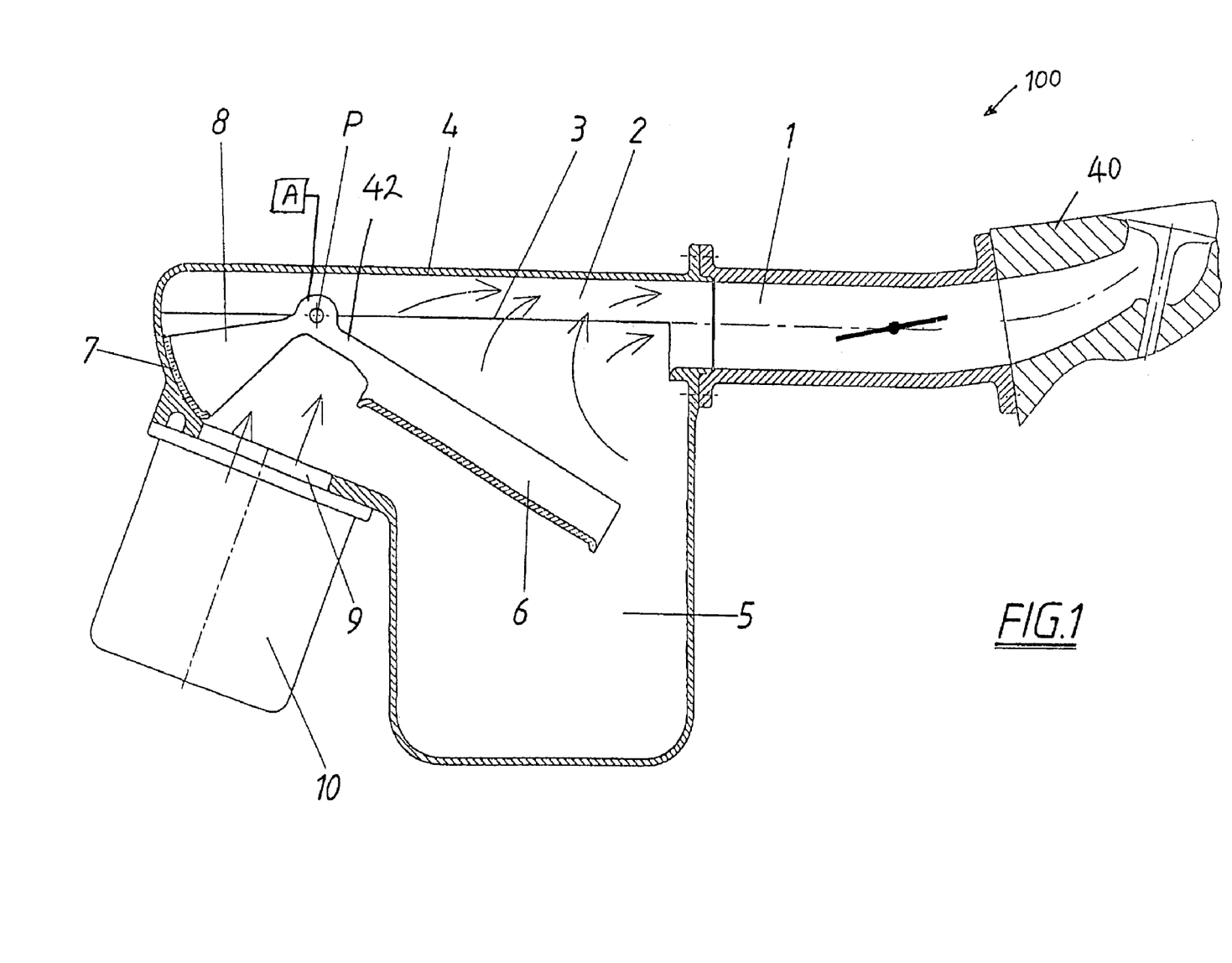
FIG. 1 is a side view in cross section of a suction pipe with an air box and a movable tube part swivelled away from an immovable tube part in accordance with an embodiment of the invention.

FIG. 1 shows an air intake system 100 that forms part of an internal combustion engine. The air intake system 100 includes an air box 5 that is connected to a suction pipe 1 at its upper end 2 as seen in FIG. 1. The suction pipe 1 extends from air box 5 along an axis 3 and forms part of the air box 5. As is known, the suction pipe 1 connects to the cylinder case or head 40 of the engine to supply air for the combustion process.

Suction pipe 1, as seen in FIG. 1, has a portion integral with the upper end 2 of the air box 5 that is divided in two parts about a plane along the suction pipe axis 3. One tube part 4 is immovably built into the air box 5. The other tube part 6 is movably connected to the air box 5 at pivot point P. According to the embodiment seen in FIG. 1, the movable tube half 6 is movably mounted about pivot point P, which is positioned on the extended pipe axis 3.

It should be noted that, according to another preferred embodiment, the section of the suction pipe 1 connecting the cylinder head 40 to the divided part of the suction pipe should be minimized in length for a high-performance engine. In other words, the length of the suction pipe should be as short as possible for high-performance engines.

Tube part 6 is mounted on one end of a pivoting bracket 42. The other end of bracket 42 supports an air inlet control panel 7 mounted on a support arm 8. Air inlet control panel 7 controls access to an air filter 10 mounted to the air box 5 via air inlet 9. In operation, air is drawn in from the atmosphere to the air filter 10 and through the air inlet 9 to air box 5.

Bracket 42 moves between two positions. When the bracket 42 pivots clockwise, as seen in FIG. 1, the tube part 6 and the panel 7 both move into an open position. In this position, the pipe 1 offers a short suction pipe length suitable for high engine speeds. Simultaneously, air inlet 9 of air filter 10 has its maximum cross section and is, in effect, unthrottled.

Pivoting bracket 42 counter clockwise causes tube part 6 to abut and mate with tube part 4, which offers an increased or maximum suction pipe length. In this position, the panel 7 closes the air inlet 9, at least partially, which reduces noise generated by suction in the lower speed range.

Pivoting can be effected by an actuator A, which can be embodied in any known type of control mechanism, including an electric motor, a pneumatic or hydraulic cylinder, an electromagnet, or other type of electric or mechanical device known for effecting movement in an engine.

It can be appreciated by the above description that the pivoting bracket 42 allows simple adjustment of the suction pipe 1 length and control of the air inlet 9 in a relatively compact area within the air box 5.

Figures 2, 3:
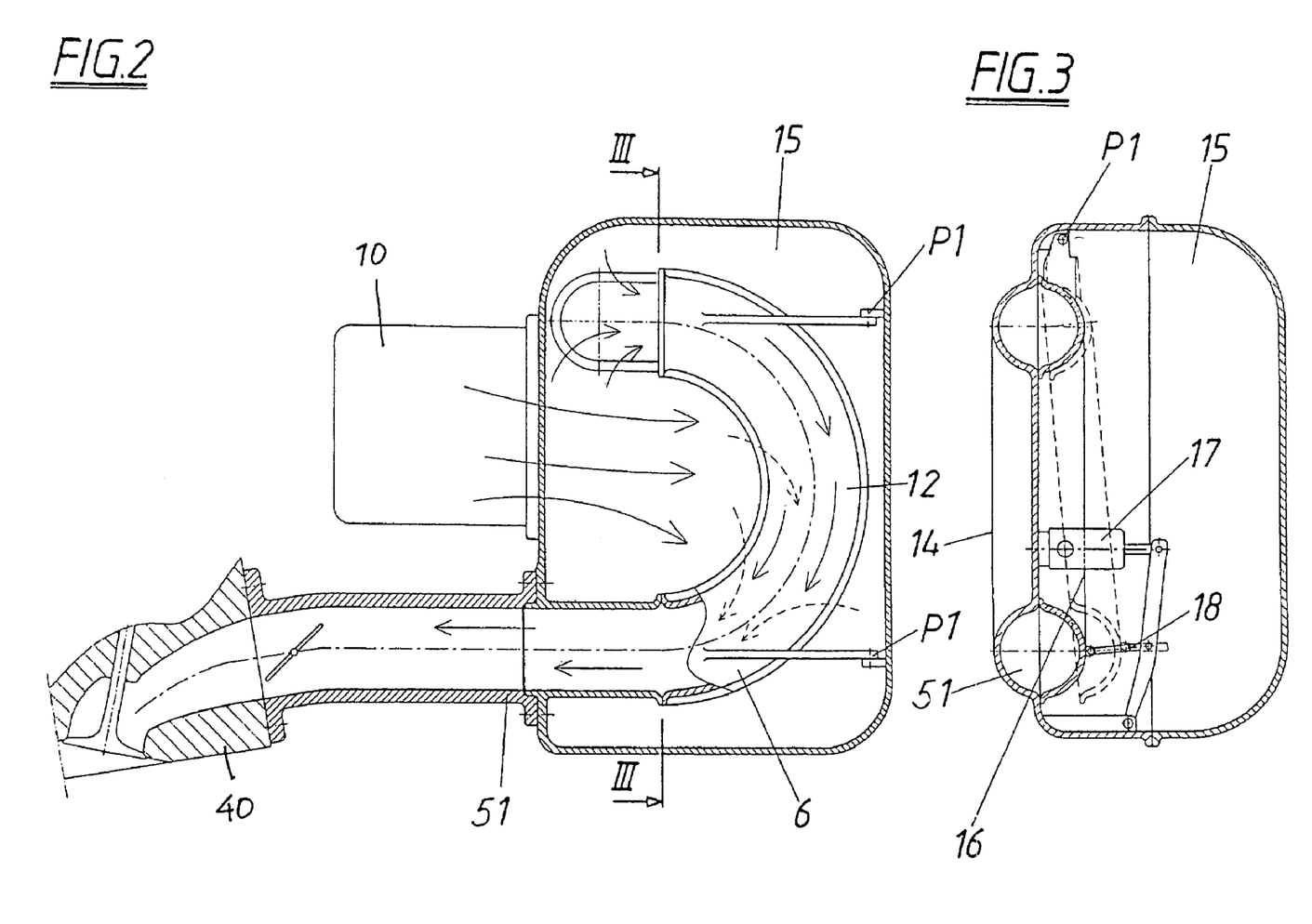
FIG. 2 is a top view in cross section of a suction pipe and an air box in accordance another embodiment of the invention.
FIG. 3 is a side view taken along line III—III of FIG. 2.

FIGS. 2 and 3 show another embodiment of the invention in which the intake pipe 51 is curved within the air box 15. This arrangement allows a more compact assembly as less area is required for the same length pipe oriented in a straight section.

To reduce the required area in the air box 15 for the suction pipe 51 and provide a large range of length adjustment, the end 12 of the suction pipe 51 is formed like an arc of a circle. One tube part 14 of the suction pipe 51 is immovably or integrally built into the air box 15, and the other, movable tube part 16 is pivotally mounted around a pivot point P1 on the air box 15. Pivoting the movable tube part 16 is effected by an actuator 17, which as noted above can be a hydraulic or pneumatic cylinder, an electromagnet or another similar electrical or mechanical device, that is mounted on the air box 15 and connected to the movable tube part 16 via a connecting rod 18. The excitation of the actuator 17 occurs based on the respective load level and/or the rotational speed of the engine.

So, like the embodiment of FIG. 1, at low speeds, the movable tube part 16 is pivoted toward fixed tube part 14 to create a longer suction pipe 51. At high speeds, the movable tube part 16 is pivoted away from fixed tube part 14 to shorten the suction pipe 51, as seen in FIG. 3 represented by dashed lines.

Figure 4:
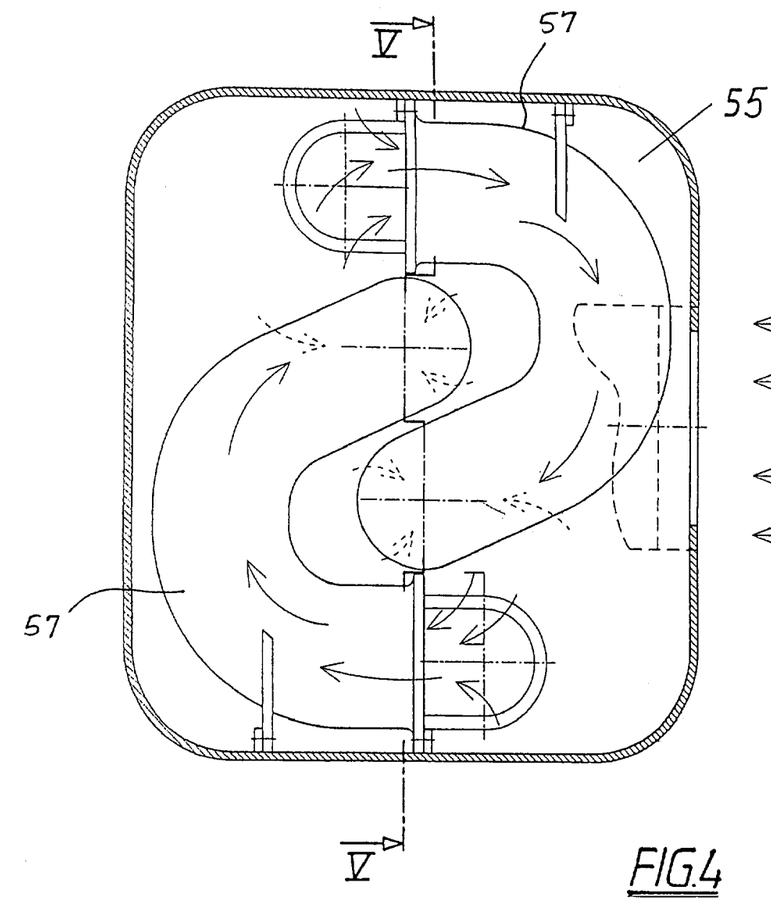
FIG. 4 is a schematic top view in partial section of a suction pipe and an air box in accordance with the invention as applied to a two cylinder engine.
Figure 5:
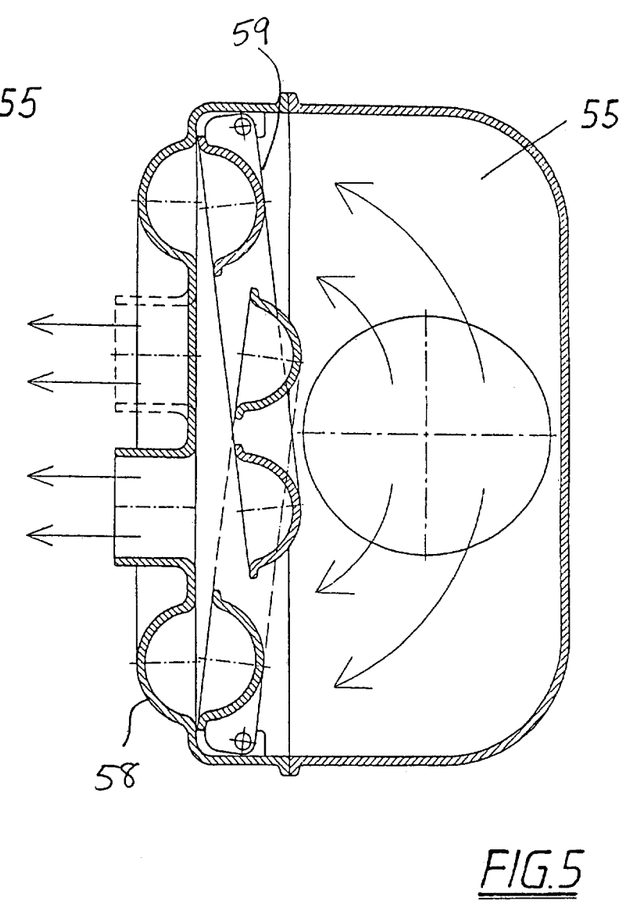
FIG. 5 is a side view taken along line V—V of FIG. 4.

The embodiment seen in FIGS. 4 and 5 corresponds basically to the design shown in FIGS. 2 and 3. However, in this case, the air box 55 is designed for a two cylinder engine. For this reason there are two suction pipe ends 57 integrated in the air box 55, with each pipe 57 having a fixed part 58 and a pivoting part 59.

In accordance with the embodiment shown in FIGS. 6 to 9, the air box 30 has an immovable, fixed suction pipe part 24 formed on one end of the box 30 and the movable suction pipe part 26 is formed in a lid 30 that may be pivoted with respect to the air box 25. The fixed suction pipe part 24 is integral with the air box 25. Of course, in this and the other embodiments described herein, it is possible to attach the fixed suction pipe part to the air box in an immovable manner such as welding or bolting without actually forming the pipe part from the air box, if desired.

Figure 6:
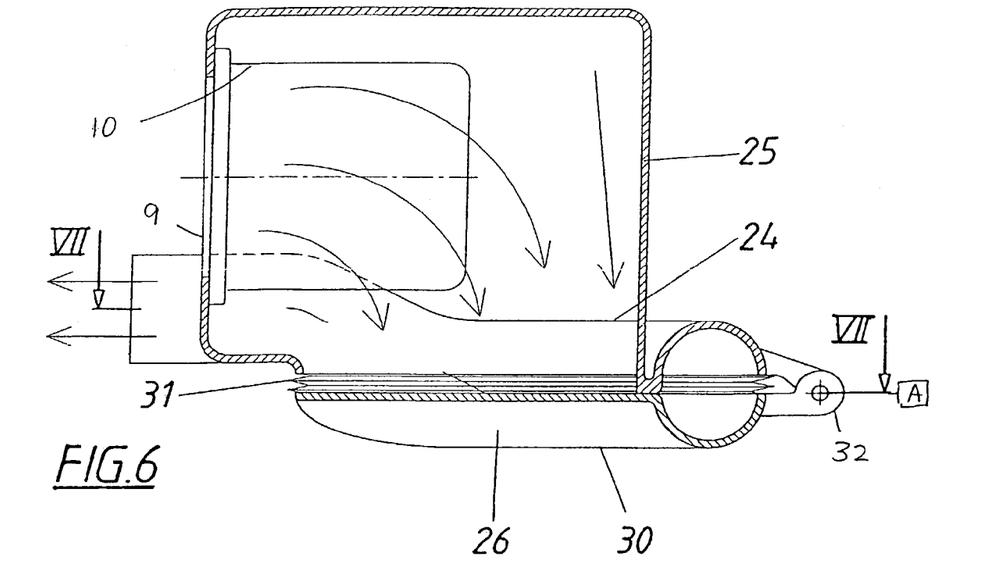
FIG. 6 is a side view in partial section of a suction pipe and air box with bellows in a closed position in accordance with an embodiment of the invention.
Figure 7:
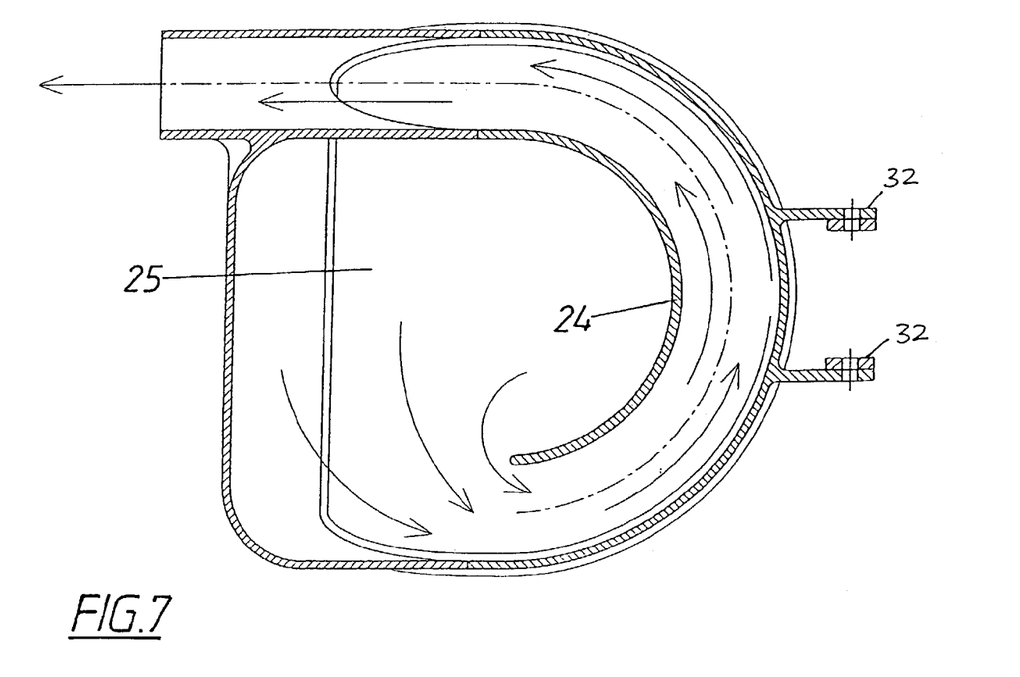
FIG. 7 is a top view in partial section taken along line VII—VII of FIG. 6.
Figure 8:
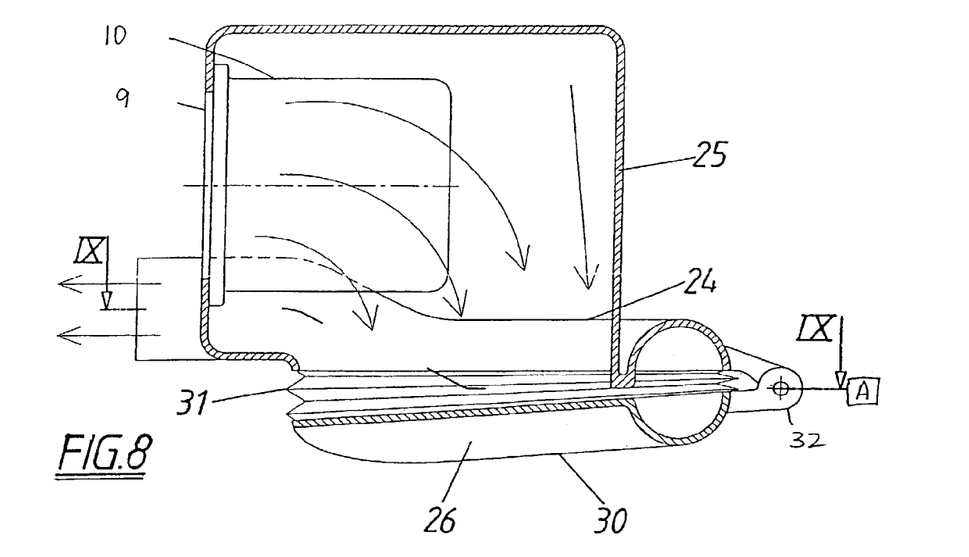
FIG. 8 is a side view in partial section of a suction pipe and air box with bellows in an open position in accordance with the embodiment shown in FIG. 6.
Figure 9:
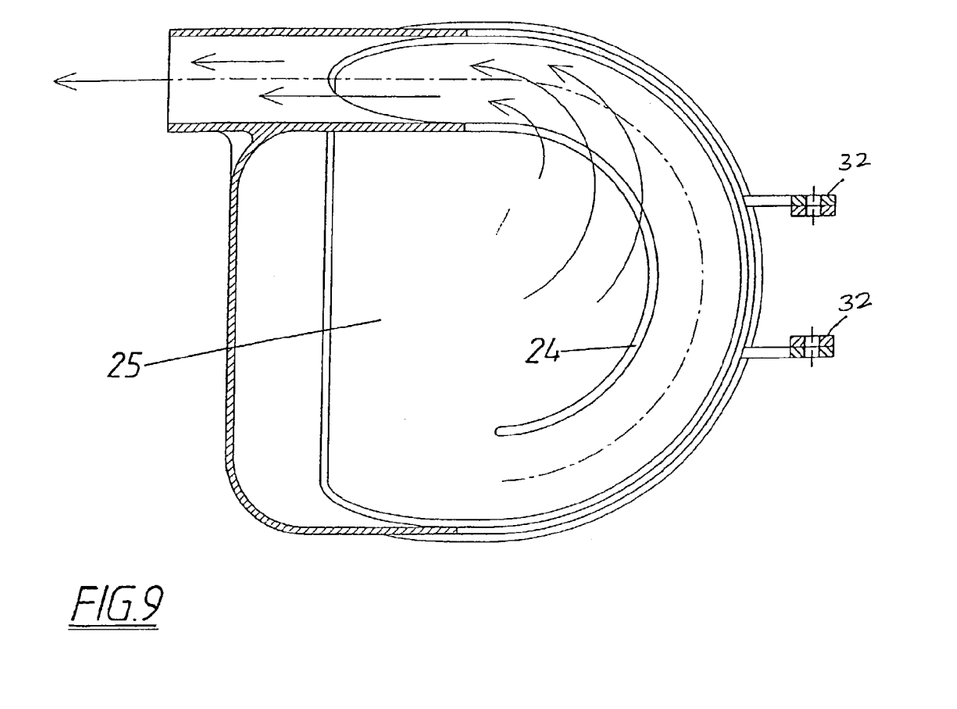
FIG. 9 is a top view in partial section taken along line IX—IX of FIG. 8.

In this case, the lid 30 is pivotally mounted at the air box 25 through a pair of hinges 32 and a bellows 31 in an airtight manner. If the lid 30 is closed tightly on the air box 25 (as seen in FIGS. 6 and 7), both tube parts 24 and 26 are joined together to form a longer suction pipe extension for higher engine speeds. If the lid 30 is lifted with respect to the air box case 25 (as seen in FIGS. 8 and 9), this results in a shorter suction pipe length for the upper speed range. The lid 30 can be controlled by an actuator A as described above. As noted above, an enlargement of the suction pipe results in an enlargement of the air box volume, which allows an additional increase in performance of the engine.

In each of the foregoing embodiments, the suction pipe is divided into two parts. The parts can be halves or can be unequal parts that, when connected, form a whole pipe for the transfer of air. Further, in each of the embodiments, the suction pipe is formed of an external pipe portion extending from the air box to the cylinder head and an internal pipe portion extending within the air box. The internal pipe portion is formed of two parts that selectively fit together. It is also contemplated that the internal pipe portion can be formed of more than two parts, for example three or more parts that consecutively fit together to offer more available lengths of pipe if desired. Moreover, it is not necessary that the multipart portion of the suction pipe be positioned internally of the air box. It is possible to provide external structure to house the multipart selectively movable portion of the suction pipe.

According to still another embodiment of the invention (not shown), a suction pipe can be used which is divided in the longitudinal direction, so that a section of the suction pipe can rotate with reference to a pivot point on or near the axis of the suction pipe. In this embodiment, a portion of the length of the suction pipe acts like a hatch or cover to a longitudinally-extending opening in the suction pipe. The hatch or cover is positioned to pivot around (or near) the axis of the suction pipe to provide a progressively larger opening into the suction pipe.

It should be noted that the present invention has been described in combination with an air box 5, at least in connection with the description of the embodiment illustrated in FIG. 1. As would be appreciated by those skilled in the art, an air box 5 encloses an air filter and helps to reduce noise generated when air is ingested thereby. While an air box is commonly used with engines for automobiles, motorcycles, and recreational vehicles (e.g., snowmobiles, boats, all terrain vehicles, and personal watercraft), for example, the present invention also may be constructed to operate without an air box.

Although the invention has been described in conjunction with specific embodiments thereof, it is evident that many alternatives, modifications and variations will be apparent to those skilled in the art. Accordingly, the scope of this invention is intended to embrace all such alternatives, modifications and variations that fall within the spirit and broad scope of the appended claims.

What is claimed is:

1. An air intake system for use in an internal combustion engine, comprising:
   an air box having an air inlet, an outlet, and an interior space; and
   a suction pipe in fluid communication with the outlet of the air box for supplying air to a cylinder head of the internal combustion engine,
   the air box having a tube in the interior space, the tube having a longitudinal central axis and being divided into at least a first and a second part, the first part being disposed on one side of the longitudinal central axis and the second part being disposed on the other side of the longitudinal central axis, the second part being selectively movable with respect to the first part between a first position in which the first part and the second part cooperate with the suction pipe to form an air passageway from the interior space towards the cylinder head, and a second position in which the second part does not cooperate with the suction pipe to form the air passageway from the interior space towards the cylinder head; and
   an inlet control device being operatively connected to the second part, the inlet control device cooperating with the inlet of the air box in response to the movement of the second part of the tube so as to restrict airflow into the airbox.

2. The air intake system of claim 1, wherein the first part of the tube forms a part of the air box.

3. The air intake system of claim 1, wherein the second part of the tube is mounted at a pivot point.

4. The air intake system of claim 1, wherein the second part of the tube is movably mounted in the interior space of the air box.

5. The air intake system of claim 1, wherein a bracket is pivotally mounted in the interior space of the air box, and the second part of the tube is mounted to one end of the bracket and the inlet control device is mounted to another end of the bracket.

6. The air intake system of claim 1, further comprising an actuator operatively coupled to the second part of the tube to selectively move the second part with respect to the first part.

7. The air intake system of claim 1, wherein the inlet control device is mechanically connected to the second part of the tube.

8. The internal combustion engine of claim 1, wherein the inlet control device includes a panel, the panel being connected to the second part, the panel being movable to restrict the airflow.

9. An internal combustion engine comprising:
   a cylinder head;
   an air intake having an air inlet; and
   a suction pipe fluidly connected between the air intake and the cylinder head;
   a tube associated with the suction pipe, the tube having a longitudinal axis and including a first part disposed on one side of the longitudinal axis and a second part disposed on the other side of the longitudinal axis, the second part being selectively movable with respect to the first part between a first position in which the first part and the second part cooperate with the suction pipe to form an air passageway towards the cylinder head, and a second position in which the second part does not cooperate with the suction pipe to form the air passageway towards the cylinder head; and
   an inlet control device being operatively connected to the second part, the inlet control device cooperating with the air inlet in response to the movement of the second part of the intake tube so as to restrict air flow through the air intake.

10. The internal combustion engine of claim 9, wherein the inlet control device includes a panel, the panel being connected to the second part, the panel being movable to restrict the flow of air through the air intake.

11. An air intake system for use in an internal combustion engine, comprising:
an air intake having an air inlet and an outlet; and
a suction pipe being in fluid communication with the outlet of the air intake for supplying air to a cylinder head of the internal combustion engine;
a tube associated with the suction pipe, the tube having a longitudinal central axis and including a first part disposed on one side of the longitudinal central axis and a second part disposed on the other side of the longitudinal central axis, the second part being selectively movable with respect to the first part between a first position in which the first part and the second part cooperate with the suction pipe to form an air passageway towards the cylinder head, and a second position in which the second part does not cooperate with the suction pipe to form the air passageway the cylinder head; and
an inlet control device being connected to the second part, the inlet control device being selectively movable over the air inlet of the air intake in response to the movement of the second part of the suction pipe.

12. An air intake system for use in an internal combustion engine, comprising:
an air box having an air inlet, an outlet, and an interior space; and
a suction pipe in fluid communication with the outlet of the air box for supplying air to a cylinder head of the internal combustion engine,
the air box having a tube in the interior space, the tube having a longitudinal axis and including a first part disposed on one side of the longitudinal axis and a second part disposed on the other side of the longitudinal axis, the second part being selectively movable with respect to the first part between a first position in which the first part and the second part cooperate with the suction pipe to form an air passageway from the interior space towards the cylinder head, and a second position in which the second part does not cooperate with the suction pipe to form the air passageway from the interior space towards the cylinder head; and
the second part having a first end and a second end, the second end being arranged upstream of the first end with respect to the gas flow to the cylinder head along the longitudinal central axis of the tube;
the first part and the second part of the tube defining an average diameter equivalent to that of the suction pipe, when in the first position; and
the second part of the tube being mounted at a pivot point so that a first end of the second part is moved away from the first part of the tube in a direction away from the longitudinal axis of the tube; and
the second part of the tube having a length along the longitudinal axis,
the length of the second part of the tube being at least twice the average diameter of the tube.

13. The air intake system of claim 12, wherein the first part of the tube forms a part of the air box.

14. The air intake system of claim 12, wherein the pivot point is disposed inside the air box.

15. The air intake system of claim 12, wherein a bracket is pivotally mounted within the air box and the second part of the tube is mounted to one end of the bracket and an inlet control panel is mounted to the other end, the inlet control panel being selectively movable over the air box inlet.

16. An internal combustion engine comprising:
a cylinder head;
an air intake; and
a suction pipe fluidly connected between the air intake and the cylinder head;
a tube associated with the suction pipe, the tube having a longitudinal axis and including a first part disposed on one side of the longitudinal axis and a second part disposed on the other side of the longitudinal axis, the second part being selectively movable with respect to the first part between a first position in which the first part and the second part cooperate with the suction pipe to form an air passageway towards the cylinder head, and a second position in which the second part does not cooperate with the suction pipe to form the air passageway towards the cylinder head; and
the second part having a first end and a second end, the second end being arranged upstream of the first end with respect to the gas flow to the cylinder head along the longitudinal axis of the tube;
the first part and the second part of the tube defining an average diameter of the tube, when in the first position; and
the second part of the suction pipe being mounted at a pivot point so that the first end of the second part is lifted off the first part of the tube in a direction away from the longitudinal axis of the tube; and
the second part of the tube having a length along the longitudinal axis.

17. The internal combustion engine of claim 16, further comprising an air inlet control panel connected to the second part that is selectively movable with respect to the air inlet.

18. An air intake system for use in an internal combustion engine, comprising:
an air intake having an air inlet and an outlet; and
a suction pipe in fluid communication with the outlet of the air intake for supplying air to a cylinder head of the internal combustion engine;
a tube associated with the suction pipe, the tube having a central axis,
the tube including a first part disposed on one side of the central axis and a second part disposed on the other side of the central axis, the second part being selectively movable with respect to the first part between a first position in which the first part and the second part cooperate with the suction pipe to form an air passageway towards the cylinder head, and a second position in which the second part does not cooperate with the suction pipe to form the air passageway towards the cylinder head;
the second part having a first end and a second end, the second end being arranged upstream of the first end with respect to the gas flow to the cylinder head along the central axis of the tube;
the first part and the second part of the tube defining an average diameter of the tube when in the first position,
the second part of the tube being mounted at a pivot point so that the first end of the second part is lifted off the first part of the tube in a direction away from the central axis of the tube; and the second part of the tube having a length along the central axis, the length of the second part of the tube being at least twice the average diameter of the tube.

* * * * *